(No Model.)
J. F. WOLFF.
LEAD TRAP AND ART OF MAKING SAME.
No. 534,057. Patented Feb. 12, 1895.
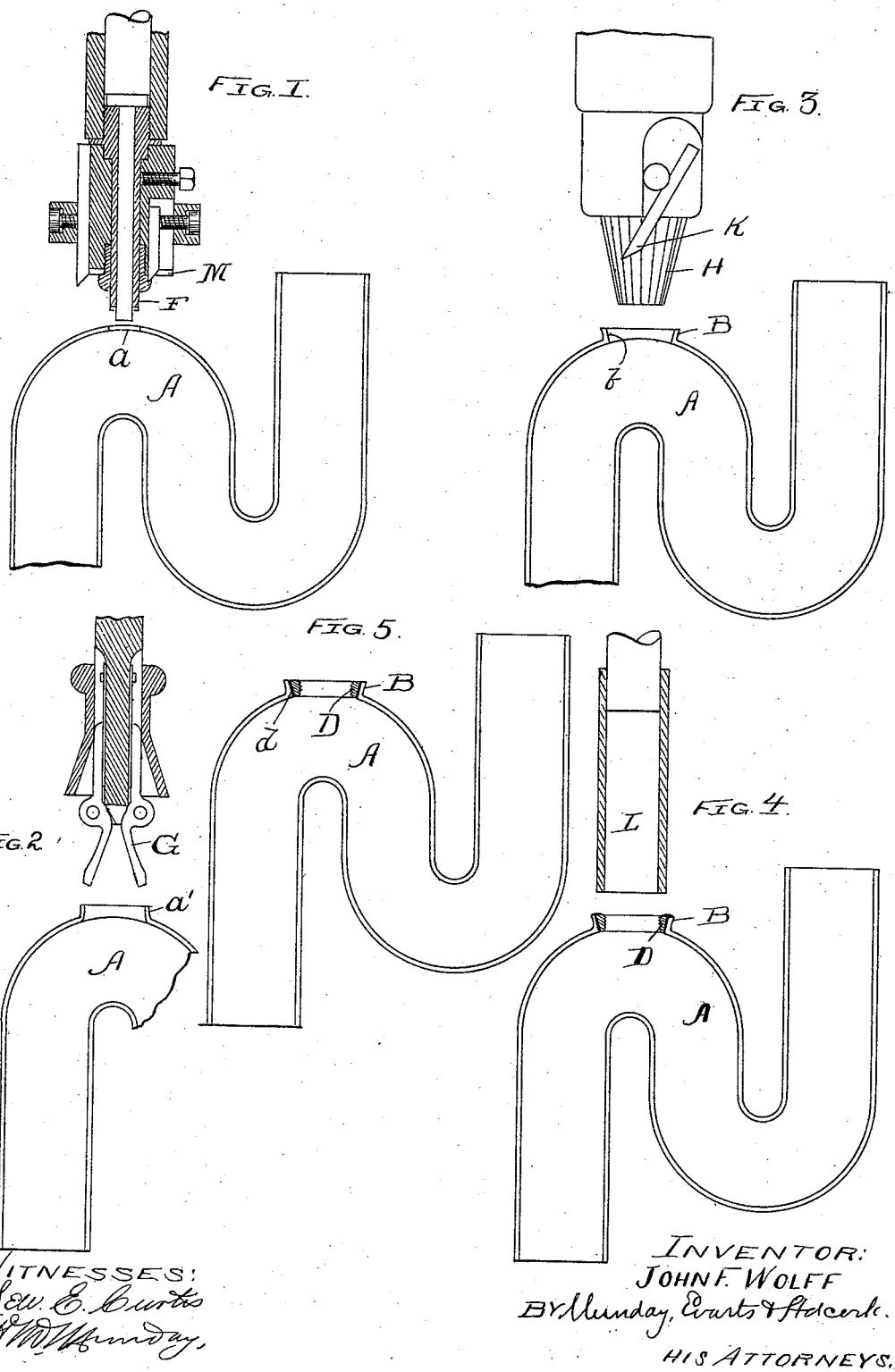
WITNESSES:
Sew. E. Curtis
H. W. Munday
INVENTOR:
JOHN F. WOLFF
BY Munday, Evarts & Adcock.
HIS ATTORNEYS.

UNITED STATES PATENT OFFICE.

JOHN F. WOLFF, OF CHICAGO, ILLINOIS, ASSIGNOR TO THE L. WOLFF MANUFACTURING COMPANY, OF SAME PLACE.

LEAD TRAP AND ART OF MAKING SAME.

SPECIFICATION forming part of Letters Patent No. 534,057, dated February 12, 1895.

Application filed August 10, 1894. Serial No. 519,969. (No model.)

*To all whom it may concern:*

Be it known that I, JOHN F. WOLFF, a citizen of the United States, residing in Chicago, in the county of Cook and State of Illinois, have invented a new and useful Improvement in Lead Traps and the Process or Art of Manufacturing the Same, of which the following is a specification.

My invention relates to the manufacture of what is commonly known as drawn or hydraulic pressed lead traps, and more particularly to the construction of the same in relation to the trap screw and means of mounting and securing the female portion of the screw in the trap.

Heretofore it has been customary to cut a hole in the lead trap at the bend thereof, about equal in diameter to the diameter of the trap screw ring, and make the trap screw ring with a lateral flange and then to solder the ring in place by solder applied or walled up laterally between the flange of the ring and the exterior wall of the trap surrounding the hole in which the ring is inserted. To prevent the trap screw ring from projecting too much into the interior of the trap and obstructing the water way, and at the same time have sufficient room for the requisite number of screw threads, it has been customary to scallop the ring out at its inner edge to conform to the curvature of the water way. This old method is not only expensive, requiring a great deal of time and labor and a large amount of solder to secure the ring in place, but it results in a product which is unsightly and non-mechanical in appearance, and which is also defective in that the water way is more or less obstructed by the interior projecting edges of the trap screw ring, especially if the greatest care is not used by the workmen in so placing the scalloped ring in position in the trap that the scalloped or cut away edges of the ring coincide properly with the water way.

The object of my improvement is to overcome these difficulties and to provide a drawn lead trap wherein the trap screw ring may be cheaply and expeditiously, and neatly and firmly secured in place in the trap without obstructing or projecting into the water way, and without the necessity of scalloping or cutting away the inner edges of the ring. With this object or new result in view I proceed as follows to accomplish it, and herein my invention in part consists.

I first take the drawn lead trap and cut a small hole therein at the bend or proper place for inserting the trap screw ring, the diameter of this small hole being about one-half or one-third that of the trap screw ring, or just large enough for the insertion of a suitable tool for performing the next step. I then draw or form the wall of the trap surrounding this small hole into an exteriorly projecting flange adapted to fit the exterior of the trap screw ring. (This exterior flange forming step is best done in three sub-steps, the same consisting in first drawing the wall surrounding the small hole from inward outward into a cylindrical flange, then drawing or turning the flange into an outwardly beveled or conical shape, and finally cutting off, trimming or squaring its upper edge.) I next insert a trap screw ring, the same having a plain exterior conical surface, into the seat formed by this integral, drawn, exteriorly projecting flange and solder the same in place by solder applied longitudinally or in the direction of the axis of the ring and between the exterior conical surface of the ring and the corresponding interior conical surface of the integral and exteriorly projecting flange formed on the trap. As the ring fits the flange perfectly, a very small amount of solder suffices to neatly and firmly and perfectly secure the ring in place in the trap.

My invention also consists in the new trap produced by my improved process, that is to say a lead trap having a drawn exteriorly projecting integral flange, and provided with a trap screw ring fitting within said flange and soldered thereto.

In the accompanying drawings I have shown at Figure 5 in central longitudinal section a drawn lead trap embodying my invention; and at Figs. 1, 2, 3 and 4 I have illustrated successive steps or stages of its manufacture.

In the drawings A represents a drawn lead trap, the same being provided with a drawn exteriorly projecting integral flange B forming a seat for a trap screw ring D. The ring D has a plain exterior conical surface $d$ corresponding to the interior conical surface $b$ of the flange B. The flange B corresponds in width or height to the trap screw ring D, and the ring D is securely soldered in place by solder flowed in between the closely fitting conical surfaces of the ring and flange.

To produce the trap or mount and secure the ring therein, I proceed as follows: I first cut a small round hole $a$ in the trap A, this being preferably done by a revolving cutting tool F, as illustrated in Fig. 1. I next draw the wall of the trap surrounding the hole $a$, as illustrated in Fig. 2, into an exteriorly projecting cylindrical flange $a'$, this being preferably done from outward by inserting a suitable tool G, comprising jaws adapted to be opened after being inserted in the hole $a$, as is clearly illustrated in Fig. 2. I next true up and bevel outward the cylindrical flange $a'$ to form the same into the conical flange B, as illustrated in Fig. 3, this being preferably done by inserting a suitable conical tool or reamer, H. I next trim off, level or square the upper edge or surface of the flange B and bring the width or length of the flange B into correspondence with the width or height of the trap screw ring D, so that the exterior end surface of the trap screw ring will fit flush with the outer edge of the flange B. This cutting or trimming step, or sub-step, is preferably performed by the knife or tool K secured to the same revolving spindle as the conical reaming tool H, so that these two sub-steps may both be performed at one and the same operation. I next insert the ring D in its seat in the flange B and solder the same therein, this being preferably done by a revolving tubular soldering tool L, as illustrated in Fig. 4. After this has been done, in order to give a perfectly true and smooth surface or finish to the outer surface of the trap screw ring D and flange B I place the same under a rotary cutting tool M, which is preferably secured to the same spindle as that which carries the first cutter or boring tool F. This cutter M smooths and trues up the outer surface of the ring D and flange B, as illustrated in Fig. 5.

I claim—

1. The improvement in the art or process of manufacturing drawn lead traps, consisting in first forming a small hole in the drawn lead trap, then drawing or forming the wall of the trap surrounding said hole into an exteriorly projecting integral flange to form a seat for the trap screw ring, then inserting the ring in place in said exteriorly projecting integral flange, and soldering together the meeting peripheral surfaces of said ring and flange, substantially as specified.

2. The process herein described, consisting in first forming a small hole in a lead trap or article, then enlarging said hole to the exterior diameter of a ring by drawing the wall surrounding said hole into an exteriorly projecting integral flange then truing up and giving a conical form to the interior peripheral surface of said flange to form a seat for the ring, and then inserting and soldering the ring in place, substantially as specified.

3. The process herein described, consisting in first forming a small hole in a drawn lead trap, then drawing the wall surrounding said hole from outward into a cylindrical projecting flange, then truing up and giving a conical form to the interior surface of said flange to conform to the exterior surface of the trap screw ring, then trimming or squaring the outer edge of said flange, then inserting and soldering the trap screw ring in place in said flange, substantially as specified.

4. The process herein described, consisting in first forming a small hole in a drawn lead trap, then drawing the wall surrounding said hole from outward into a cylindrical projecting flange, then truing up and giving a conical form to the interior surface of said flange to conform to the exterior surface of the trap screw ring, then trimming or squaring the outer edge of said flange, then inserting and soldering the trap screw ring in place in said flange, and finally smoothing or squaring off the outer end surface of said ring and flange, substantially as specified.

5. The combination with a drawn lead trap having an integral exteriorly projecting flange, flaring outwardly on the inside of a conical or tapering trap screw ring soldered within said flange, substantially as specified.

6. The combination with a drawn lead trap provided with an integral exteriorly projecting flange, having an interior conical surface, of a trap screw ring, having an exterior conical surface, within said flange and soldered thereto, by solder applied at the meeting conical surfaces of the ring and flange, substantially as specified.

JOHN F. WOLFF.

Witnesses:
H. M. MUNDAY,
EMMA HACK.